United States Patent
LeMonnier et al.

(10) Patent No.: US 11,472,376 B2
(45) Date of Patent: Oct. 18, 2022

(54) WIPER BLADE FOR WINDSHIELD WIPER DEVICE AND CORRESPONDING WINDSHIELD WIPER DEVICE

(71) Applicant: DOGA, S.A., Barcelona (ES)

(72) Inventors: Marie LeMonnier, Barcelona (ES); Antonio Garcia Coma, Barcelona (ES); Alejandra Martí Jover, Barcelona (ES)

(73) Assignee: DOGA, S.A., Barcelona (ES)

(*) Notice: Subject to any disclaimer, the term of this patent is extended or adjusted under 35 U.S.C. 154(b) by 0 days.

(21) Appl. No.: 16/943,311

(22) Filed: Jul. 30, 2020

(65) Prior Publication Data
US 2021/0039606 A1 Feb. 11, 2021

(30) Foreign Application Priority Data
Aug. 7, 2019 (EP) .................................. 19382698

(51) Int. Cl.
*B60S 1/38* (2006.01)

(52) U.S. Cl.
CPC .......... *B60S 1/3853* (2013.01); *B60S 1/3872* (2013.01); *B60S 1/3877* (2013.01);
(Continued)

(58) Field of Classification Search
CPC .... B60S 1/3853; B60S 1/3436; B60S 1/3427; B60S 1/38; B60S 1/3874; B60S 1/3875;
(Continued)

(56) References Cited

U.S. PATENT DOCUMENTS

| 5,412,834 A * | 5/1995 | Burkard .................... B60S 1/38 |
| | | 15/250.31 |
| 6,112,365 A * | 9/2000 | Ullrich .................. B60S 1/3801 |
| | | 15/250.451 |
| 2005/0044651 A1 | 3/2005 | Lee |

FOREIGN PATENT DOCUMENTS

| DE | 10040129 | * 6/2002 |
| DE | 10 2013 212 498 A1 | 12/2014 |

(Continued)

OTHER PUBLICATIONS

Machine language translation of description portion of German publication 10040129, published Jun. 2002. (Year: 2002).*

(Continued)

*Primary Examiner* — Gary K. Graham
(74) *Attorney, Agent, or Firm* — Julie K. Staple; Dinsmore & Shohl LLP

(57) ABSTRACT

The invention relates to a blade for a windshield wiper device and to a corresponding windshield wiper device. The blade comprises a blade body for wiping said windshield surface and a longitudinal rib. The body has a first housing extending longitudinally inside the body and having at least one insertion end. The rib has a cross-section complementary to the cross-section of the first housing. Furthermore, the rib comprises a plurality of interlocking members protruding from its surface by way of a harpoon with an interlocking end. The plurality of interlocking members is oriented such that they allow the insertion of the first end of the rib through the insertion end for assembling the blade, but prevent the extraction of the rib from the first housing.

10 Claims, 7 Drawing Sheets

(52) U.S. Cl.
CPC .. *B60S 2001/382* (2013.01); *B60S 2001/3825* (2013.01); *B60S 2001/3836* (2013.01)

(58) Field of Classification Search
CPC ...... B60S 1/3877; B60S 1/3881; B60S 1/345; B60S 1/3459; B60S 1/3461; B60S 1/3879; B60S 2001/3825; B60S 2001/382; B60S 2001/3827; B60S 2001/3826; B60S 1/3872
USPC ............ 15/250.34, 250.48, 250.43, 250.361, 15/250.451–250.453
See application file for complete search history.

(56) References Cited

FOREIGN PATENT DOCUMENTS

FR        2886250      * 12/2006
WO    2007/014395 A2    2/2007

OTHER PUBLICATIONS

Machine language translation of description portion of French publication 2886250, published Dec. 2006. (Year: 2006).*
English Machine Translation of DE102013212498.
European Search Report of EP 19382698, dated Jan. 20, 2020.

* cited by examiner

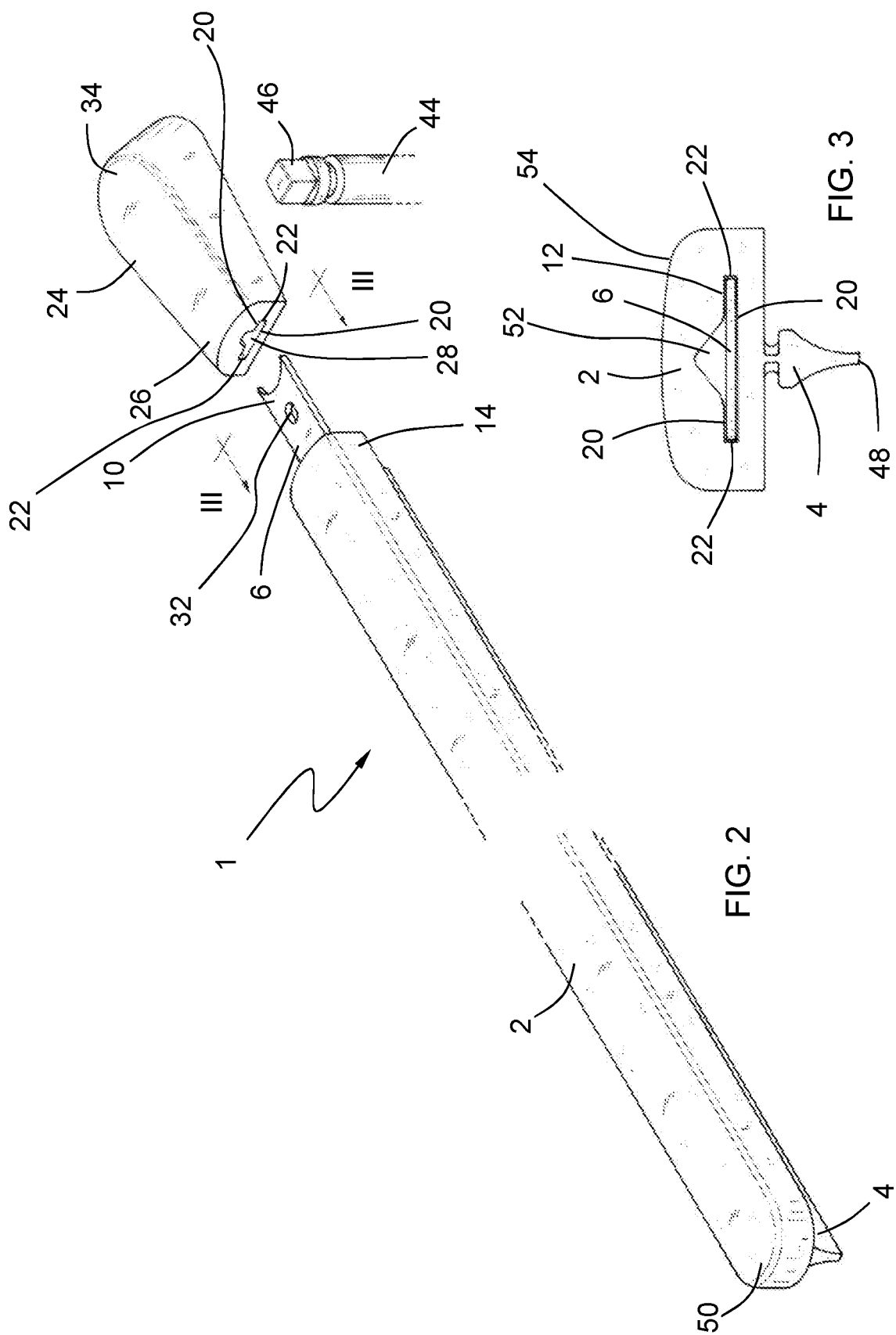

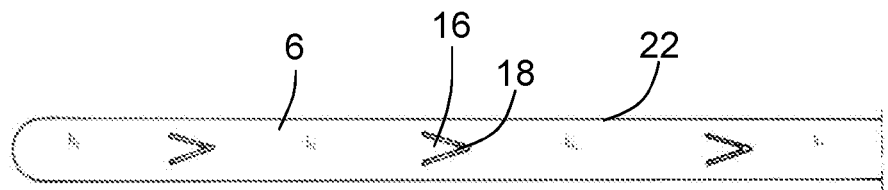
FIG. 5A
FIG. 5B
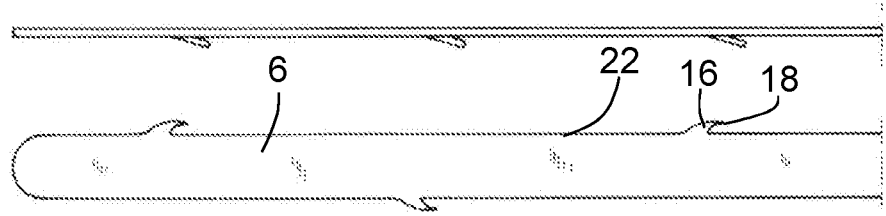
FIG. 6A
FIG. 6B
FIG. 7A
FIG. 7B
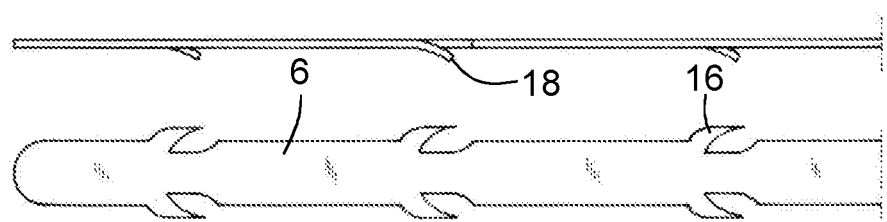
FIG. 8A
FIG. 8B
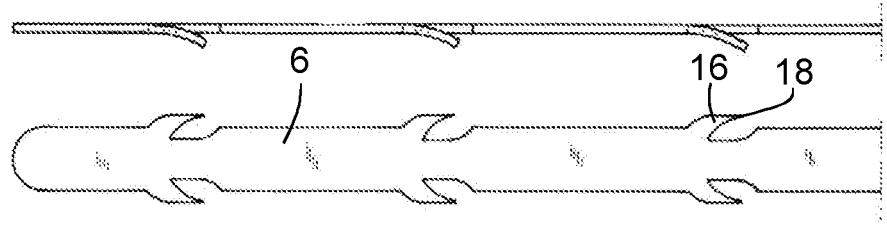
FIG. 9A
FIG. 9B
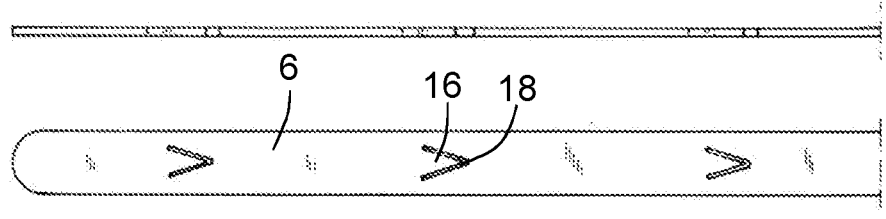
FIG. 10A
FIG. 10B

WIPER BLADE FOR WINDSHIELD WIPER DEVICE AND CORRESPONDING WINDSHIELD WIPER DEVICE

REFERENCE TO RELATED APPLICATION

This application claims priority to European Patent Application No. 19382698.9, filed Aug. 7, 2019, the entire content of which is incorporated herein by reference.

FIELD OF THE INVENTION

The invention relates to a blade for a windshield wiper device for wiping a windshield surface comprising a blade body made of an elastic material with a wiping projection for wiping said windshield surface and extending longitudinally and a longitudinal rib having first and second ends.

The invention also relates to a windshield wiper device comprising a blade according to the invention.

BACKGROUND OF THE INVENTION

Windshield wiper devices including blades assembled either in a windshield wiper arm driven by a motor or directly on the shaft of the motor are known in the automotive sector.

This sector is known as being highly demanding in terms of costs, and particularly in terms of spare parts. Windshield wipers are elements which must be regularly changed. This leads to the need to search for simple and easy to manufacture solutions that allow reducing costs as much as possible.

Document WO 2007/014395 A2 discloses a windshield wiper device having a blade with a blade body made of a rubber-type elastic material with a longitudinally extending wiping projection and a longitudinal rib. The longitudinal rib is inserted into a longitudinal cavity of the blade. To assure a good attachment between both parts, the longitudinal rib has a plurality of indentations on the longitudinal sides. Furthermore, are provided crimping elements which are assembled on the outer perimeter of the blade body, in the area in which the indentations are provided. The crimping elements are compressed against the blade body and this leads to the elastic material of the blade body being introduced in the indentations to assure a good attachment between both portions. This solution is complicated and requires assembly experience. Closing the crimping elements too much can damage the elastic material of the blade body, while not closing them enough can cause relative movements between the rib and the blade body.

SUMMARY OF THE INVENTION

The object of the invention is to provide a blade for a windshield wiper device for wiping the windshield surface of the type indicated above, that is easy to assemble and inexpensive, but which still provides high levels of wiping reliability and is long-lasting.

This object is achieved by means of a blade of the type indicated above, characterized in that the blade body comprises a first housing extending longitudinally inside said blade body and having at least one insertion end, in that said rib has a cross-section complementary to the cross-section of said first housing, and in that said rib further comprises a plurality of interlocking members protruding from the surface of said rib by way of a harpoon with an interlocking end and said plurality of interlocking members being oriented such that they allow the insertion of said first end of said rib through said insertion end for assembling said blade, but prevent the extraction of said rib from said first housing by the interlocking of said interlocking end in said blade body.

The problem considered by the invention is solved precisely as a result of the shape of the interlocking members. These interlocking members by way of a harpoon allow the insertion of the rib in the blade body, but in contrast interlock with the interlocking end in the walls of the first housing of the blade body.

In the invention, the expression by way of a harpoon relates to the fact that the interlocking members facilitate the insertion of the rib in the blade body, but in contrast block the extraction of the rib from the blade. That is, during assembly the force needed to insert the rib is low enough to allow complete insertion thereof. In contrast, the eventual extraction of the rib implies the detachment of the interlocking members from the inner walls of the blade body and the subsequent damage in the structure thereof. This effect assures an excellent attachment between both parts which allows eliminating any additional element to assure that they do not separate from one another during the operation of the blade when wiping the windshield.

Despite the simplicity and reduced cost of this blade, the wiping is likewise reliable and the blade does not become worn prematurely with respect to the blades of the state of the art.

The invention further includes a number of preferred features that are object of the dependent claims and the utility of which will be highlighted hereinafter in the detailed description of an embodiment of the invention.

In a preferred embodiment, which seeks to prevent relative movements between the rib and the body of the blade, the first housing and said rib respectively have complementary rectangular cross-sections, with two opposite larger sides and two opposite smaller sides, said wiping projection protruding from one of said larger sides. Furthermore, this considerably simplifies manufacture, since the strip can be readily manufactured, for example, by stamping.

Preferably the rib is a metallic strip, and more preferably it is a steel strip for springs to assure optimal adaptability to the windshield. Alternatively, the rib can be made of a plastic material formed with pre-stressing and reinforced with fillers such as glass fibers and carbon fibers. In another possible embodiment, the rib can be made of a composite material such as carbon fiber and resin, glass fiber and resin, or the like.

In another preferred embodiment which has the purpose of achieving a uniform behaviour of the blade, each of the interlocking members of said plurality of interlocking members protrudes individually from said rib laterally, upwards, downwards, or in combinations of all the preceding alternatives and with a regular distribution along said rib. This improves the clamping between rib and body. Likewise, a regular distribution does not necessarily imply that each of the interlocking members is at an identical distance with respect to the immediately adjacent interlocking members.

Optionally, each of the interlocking members of said plurality of interlocking members protrudes from at least one of said larger sides, from at least one of said smaller sides, or from both larger and smaller sides simultaneously. If the members protrude laterally, it is easier to conceal their presence.

In a particularly preferred manner said rib and said interlocking members are formed from a single part. Therefore, manufacture is simplified and costs are reduced, particularly when the rib is a flat strip with the interlocking members protruding from the sides and only towards the sides. This is a completely flat part which can be produced by stamping with a single forming step in a very simple manner.

In another embodiment said first housing has a longitudinally extending notch, as a result of which the force needed to insert the rib into the blade body is reduced and the assembly is simplified.

The invention also considers the problem of simplifying the assembly of the blade as a whole. Therefore, in another preferred embodiment, the blade further comprises a blade support and in that said blade comprises first snap-fitting means for keeping said rib and said support attached to one another, said snap-fitting means being formed by a first hole provided in said rib and a first snap-fitting member provided in said support, said first snap-fitting member being movable between: a snap-fitting position, in which said first snap-fitting member snap fits in said first hole, and a release position, in which said first snap-fitting member is separated from said first hole and said rib and said support can be separated from one another, which facilitates the insertion and coupling of the rib with the support without the need for tools.

In a particularly preferred manner, for the case of blades of small dimensions said first hole is provided at said second end.

In a particularly preferred manner for the case of rear window blades which are usually assembled in the upper portion of the rear window and in which the arm has to be particularly simple and inexpensive, support comprises a first coupling end having a second housing for receiving said second end of said rib. This enables the blade not to require a blade-holding arm, such that the blade becomes a blade-arm. This assembly is very easy and reliable.

The invention also relates to a windshield wiper device comprising a blade according to the invention.

Therefore, one problem solved by the invention consists of proposing a windshield wiper device having a simple assembly and not requiring final adjustments for its correct assembly.

Therefore, the windshield wiper device according to the invention further comprises a drive device with an adjustable initial angular position and with an oscillating drive shaft, said drive shaft comprising a drive end having a coupling segment, and in that said support comprises a second coupling end having a third housing for receiving said coupling segment, said coupling segment and said third housing, respectively, having complementary cross-sections for tight mutual coupling, and said cross-sections with a regular polygon shape having between three and ten sides. In effect, the drive device has a position fixed to the vehicle frame, but furthermore, the position of the drive shaft is known and identical. In known devices, the coupling segment has a ridging that requires a very tedious fitting of the blade-carrying arm or of the blade itself during the initial assembly of the set. In contrast, in the device according to the invention the cross-section with a regular polygon shape having between three and ten sides, defines few initial assembly positions that greatly facilitates the initial assembly of the set, since the initial angular assembly position of the windshield wiper device is always identical.

Finally, and to facilitate assembly and disassembly of the blade, said device comprises second snap-fitting means for keeping said support and said drive shaft attached to one another, said snap-fitting means being formed by a perimeter groove provided in said drive shaft and a second snap-fitting member provided in said third housing, said second snap-fitting member being movable between: a snap-fitting position, in which said second snap-fitting member snap fits in said perimeter groove, and a release position, in which said second snap-fitting member is separated from said perimeter groove and said support and said drive shaft can be separated from one another.

Likewise, the invention also includes other features of detail illustrated in the detailed description of an embodiment of the invention and in the accompanying figures.

BRIEF DESCRIPTION OF THE DRAWINGS

Further advantages and features of the invention will become apparent from the following description, in which, without any limiting character, preferred embodiments of the invention are disclosed, with reference to the accompanying drawings in which:

FIG. 2 shows a partially exploded view of the blade of FIG. 1;

FIG. 3 shows a view of the blade according to the section along plane of FIG. 2;

FIGS. 5A and 5B show a front view and a top plan view of a first embodiment of a rib for a blade according to the invention;

FIGS. 6A and 6B show a front view and a top plan view of a second embodiment of a rib for a blade according to the invention;

FIGS. 7A and 7B show a front view and a top plan view of a third embodiment of a rib for a blade according to the invention;

FIGS. 8A and 8B show a front view and a top plan view of a fourth embodiment of a rib for a blade according to the invention;

FIGS. 9A and 9B show a front view and a top plan view of a fifth embodiment of a rib for a blade according to the invention;

FIGS. 10A and 10B show a front view and a top plan view of a sixth embodiment of a rib for a blade according to the invention;

DETAILED DESCRIPTION OF THE INVENTION

Figure 1:
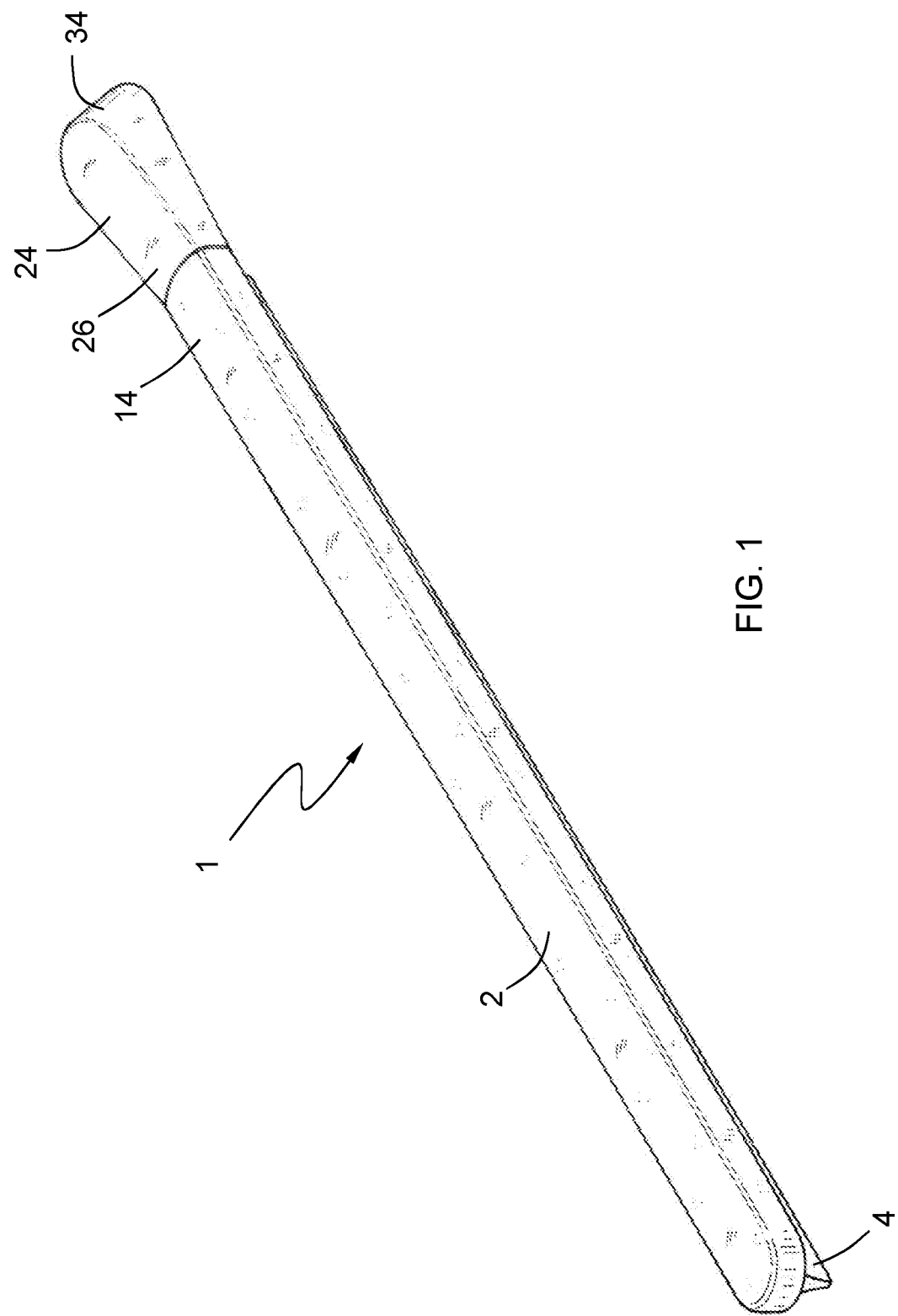
FIG. 1 shows a perspective view of a blade according to the invention.

First, the blade according to blade 1 for a windshield wiper device 100 for wiping a windshield surface according to the invention is explained in detail.

The blade 1 according to the invention has as its main elements, in the most generic embodiment of the invention, a blade body 2 and a rib 6.

The blade body 2 extends longitudinally and is manufactured from an elastic material, such as, for example vulcanized rubber. In its assembled state, the blade body 2 has one face opposite the windshield and one face looking away from same. A substantially triangular-shaped wiping projection 4 protrudes from the face of the blade body 2 opposite the windshield for wiping the windshield surface through the lip 48 formed at the contact end with the windshield.

The longitudinal rib 6 has first and second ends 8, 10.

It can be seen in the drawings that the blade body 2 has a first housing 12 extending longitudinally inside the blade body 2, and in this case has an insertion end 14, whereas in this embodiment at the end 50 opposite the insertion end the body 2 is closed. Alternatively, the blade body 2 could be open at both ends, such that the rib 6 could be inserted through either of them.

It can be seen in FIG. 3 that the rib 6 has a cross-section complementary to the cross-section of said first housing 12. The fact that both cross-sections are complementary does not imply that both sections are identical. As seen in FIG. 3, in the housing 12 forms a notch 52 extending in the longitudinal direction of the blade body 2. The notch 52 facilitates the insertion of the rib 6 during assembly of the set.

Figure 13:
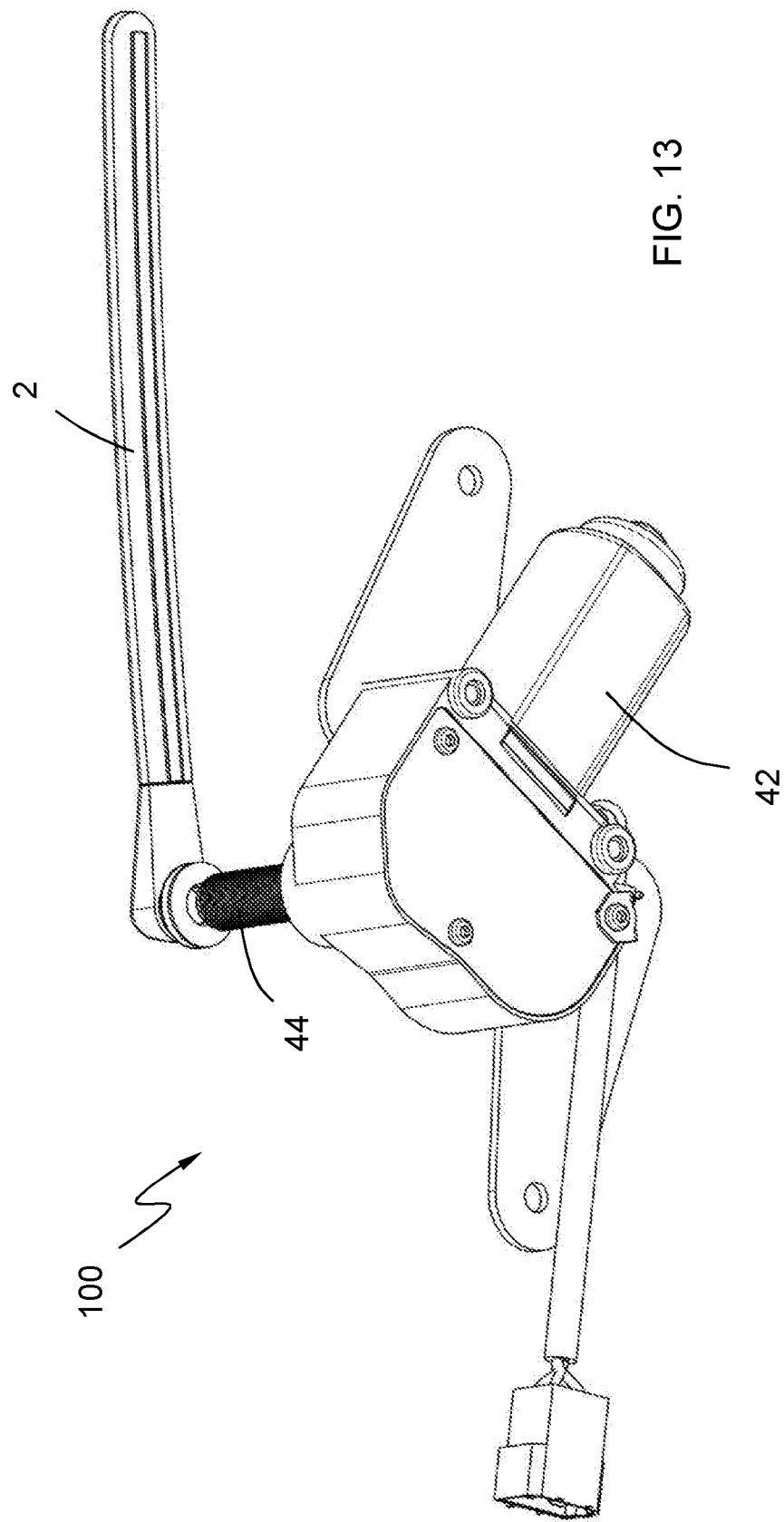
FIG. 13 shows a bottom perspective view of a windshield wiper device according to the invention.

The cross-section of the rib 6 and of the first housing can have any shape. Nevertheless, in this preferred embodiment, the first housing 12 and the rib 6, respectively, have substantially rectangular cross complementary sections with two larger sides 20 opposite and two opposite smaller sides 22. Thus, as can be seen in FIG. 13, the blade 1 in the assembly position is oriented such that the wiping projection 4 from one of the larger sides 20 for the lip 48 to clean the corresponding windshield or rear window surface.

In order for a blade 1 to be easy to assemble and inexpensive, but which still provides high levels of wiping reliability and is long-lasting, in the invention the rib 6 is envisaged to further comprise a plurality of interlocking members 16. This plurality of interlocking members protrudes from the surface of the rib 6 by way of a harpoon with an interlocking end 18.

Figure 4:
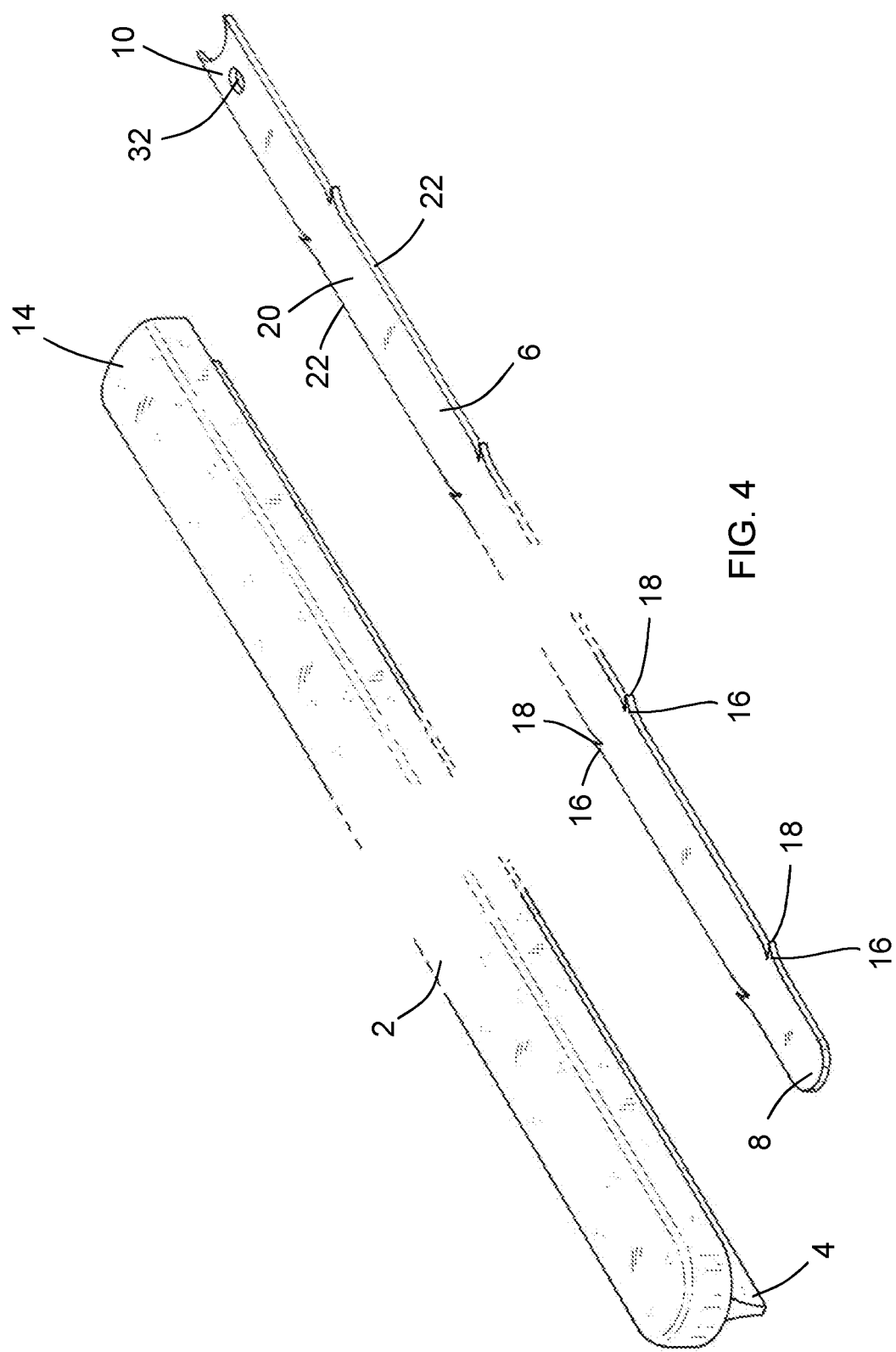
FIG. 4 shows an exploded perspective view of the blade body and of the rib of the blade of FIG. 1.

It can be seen in FIG. 4 how this plurality of interlocking members 16 is oriented such that it allows the insertion of the first end 8 of the rib 6 through the insertion end 14 for assembling said blade 1. That is, the interlocking end 18 of the interlocking members is oriented in the direction of the second end 10. This means that once the rib is inserted inside the housing 12, extraction of the rib 6 from the first housing 12 is prevented as a consequence of the interlocking of the interlocking end 18 in the inner walls of the housing of the blade body 2.

FIGS. 5A to 10B show different embodiments of the rib 6 according to the invention in which the rib 6 is a strip having a substantially rectangular cross-section. In these examples, the rib 6 and the interlocking members 18 are formed from a single part. Alternatively, the interlocking members could be embedded in the rib 6, as independent elements.

In the embodiment of FIGS. 5A and 5B each of the interlocking members 16 of the plurality of interlocking members 16 protrudes individually from the larger side of the rib 6 and downwards, i.e., pointing downwards, with a regular distribution along said rib 6. This embodiment has the advantage that the material of the rib is maximally utilized.

In the embodiment of FIGS. 6A and 6B each of the interlocking members 16 protrudes individually from the smaller sides 22 of the rib 6, laterally in the form of a hook. This embodiment has the advantage that it is a flat part that is simple to manufacture in a single stamping step.

In the embodiment of FIGS. 7A and 7B, each of the interlocking members 16 is formed by an undercutting of the sides of the rib 6 and protrudes individually from the smaller sides 22 of the rib 6 and downwards.

In the embodiment of FIGS. 8A and 8B each of the interlocking members 16 protrudes individually from the smaller sides 22 of the rib 6 and downwards.

In the embodiment of FIGS. 9A and 9B each of the interlocking members 16 protrudes individually from the smaller sides 22 of the rib 6 laterally.

Finally, in the embodiment of FIGS. 10A and 10B the interlocking members 16 of the plurality of interlocking members 16 protrude from the larger side of the rib 6 and alternating between protruding downwardly and upwardly.

The one skilled in the art understands that the interlocking member distributions shown in the preceding drawings can also be combined in terms of shapes, distributions, and directions in which they protrude.

In its most general concept the blade 1 according to the invention can be applied to any type of windshield wiper device, i.e., the simple type including arm and blade in a single blade-arm unit, of the type in which the blade is assembled in a simple arm, or also in a pantograph type device with a double arm.

In these last two cases, the blade body 2 can have an interruption or opening central on the upper face 54, opposite the side from which the wiping projection 4 protrudes to enable assembling a support suitable for directly clamping the rib 6. In turn, this support serves as a coupling element for the corresponding windshield wiper arm.

Nevertheless, the embodiment shown in the drawings is conceived for blades of small dimensions, less than 400 mm, which do not require an independent arm and therefore form a blade-arm set. This blade 1 that is shown further comprises a blade support 24 at one of its ends. The purpose of this support 24 is to allow the assembly of the blade directly on the shaft of the drive motor. This support 24 is preferably made of a plastic material such as polyamide 6 (PA6), polyamide 66 (PA66), polyoxymethylene (POM), or the like with a mineral or glass fibre type filler. As a result of the combination of rib 6, body 2, and support 24, the integral blade-arm set is obtained.

The support 24 has a first coupling end 26 having a second housing 28 for receiving the second end 10 of the rib 6.

To facilitate the coupling between the support 24 and the body 2 and rib 6 set, the blade 1 comprises first snap-fitting means for keeping the rib 6 and the support 24 attached to one another. In particular, these snap-fitting means are formed by a first hole 32 by way of a elongated hole provided at the second end 10 of the rib 6 and a first snap-fitting member 30 provided in the support 24.

The first snap-fitting member 30 is movable between a snap-fitting position and a release position.

Figure 11:
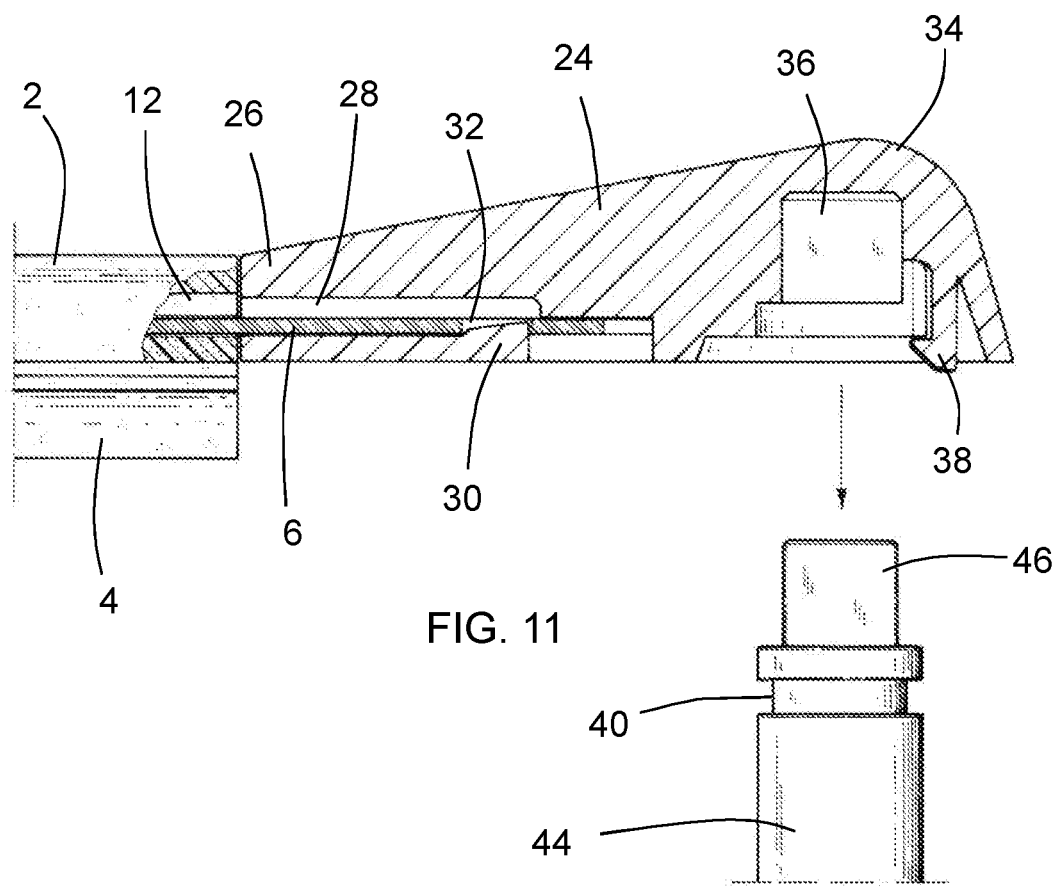
FIG. 11 shows a front partially sectioned detail view of the coupling area of the blade with the drive shaft.

In the snap-fitting position shown in FIG. 11, the first snap-fitting member 30 snap fits in the first hole 32, the head of the snap-fitting member 30 being introduced in the first hole 32 and locking support 24 and rib 6 with respect to one another.

In the release position the first snap-fitting member 30 is separated from the first hole 32, for example, by wedging a flathead screwdriver under the head of the snap-fitting member. Rib 6 and support 24 can thereby be separated from one another. This solution facilitates a simple and firm assembly but without additional elements such as screws or the like.

Figure 14:
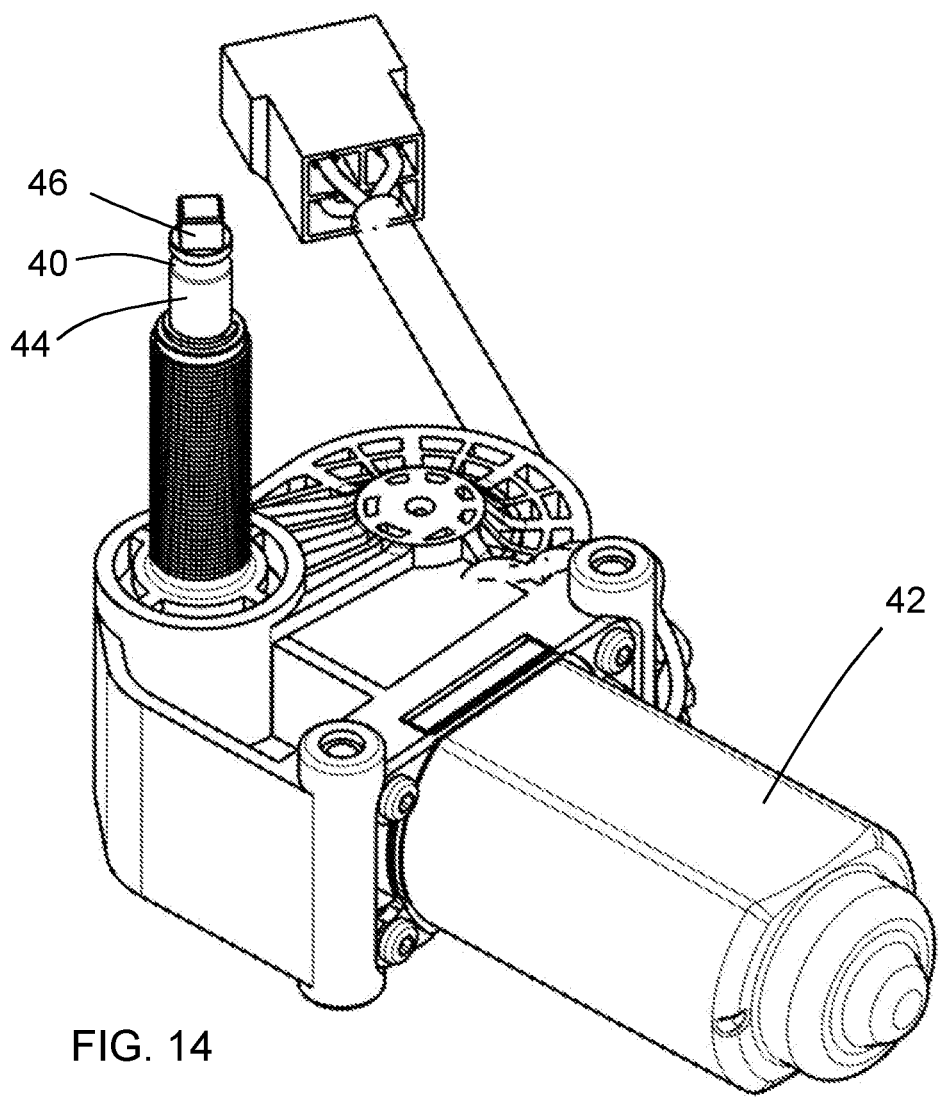
FIG. 14 shows a top perspective view of the drive device of the windshield wiper device of FIG. 13.

FIGS. 13 and 14 show an embodiment of a windshield wiper device 100 according to the invention. The windshield wiper device has a blade 1 according to the invention and furthermore has a drive device 42 with an adjustable initial angular position. Namely, the initial angular position can be adjusted to always be the same. That is, in the assembled position of the entire set, and when the windshield wiper device 100 is in standby, the blade 1 is always in the same initial position.

As a result of the drive device 42 having an adjustable initial position, the assembly of the device on the assembly line can be vastly simplified. For this purpose, the windshield wiper device 100 has an oscillating drive shaft 44 and a drive end having a coupling segment 46. In turn, the support 24 has a second coupling end 34 with a third housing 36 for receiving the coupling segment 46 of the drive shaft 44.

Figure 12:
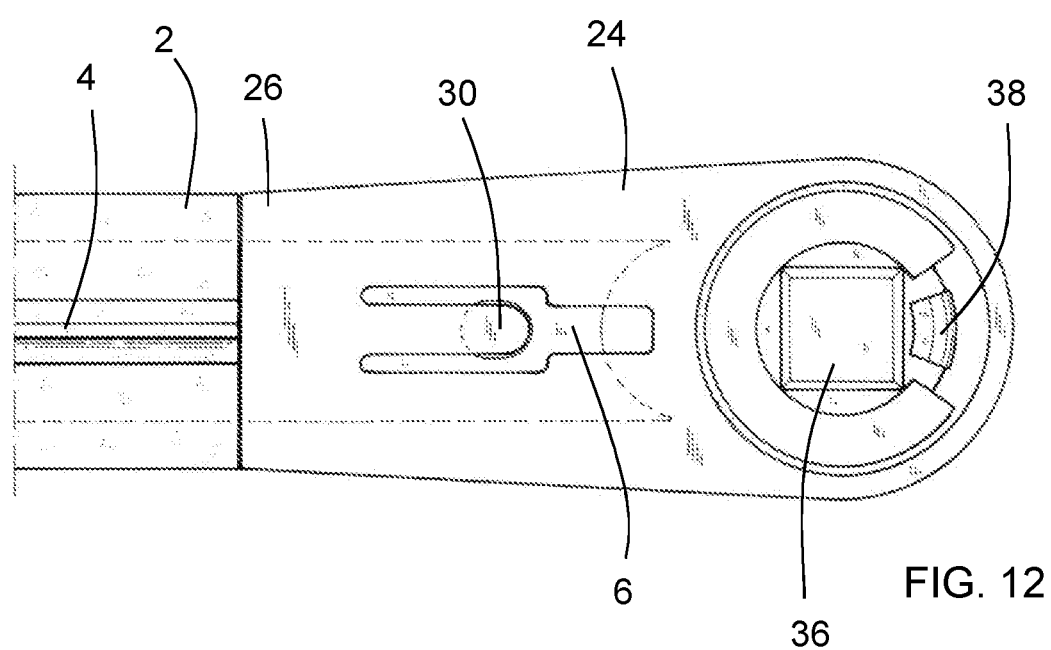
FIG. 12 shows a bottom detail plan view of the coupling area of the blade with the drive shaft.

As can be seen in FIGS. 11 and 12, the coupling segment 46 and the third housing 36, respectively, have complementary cross-sections for the tight mutual coupling between them. In the embodiment shown, the cross-sections are square. Nevertheless, these cross-sections can have a regular polygon shape having between three and ten sides.

Figure 15:
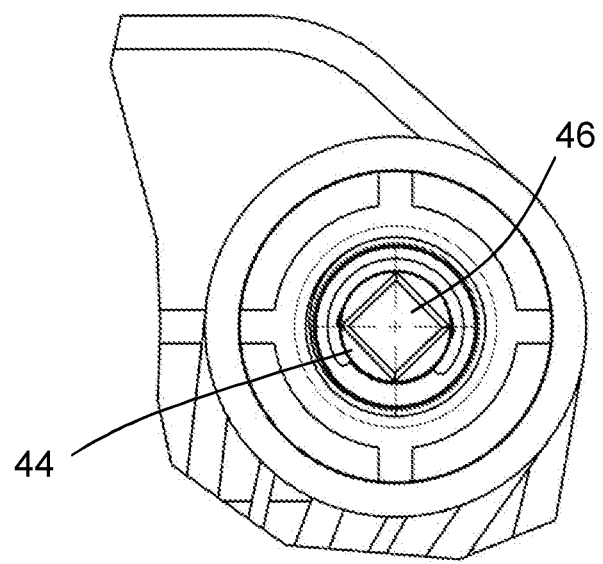
FIG. 15 shows a top plan view of the shaft of the drive device in the initial assembly position.

In the embodiment shown in FIG. 15, the initial position of the shaft if about 45° with respect to the horizontal, such that the blade 2 would also initiate the wiping stroke from this angle.

This embodiment is clearly easier to assemble than that known in the state of the art, in which the drive device does not have an adjustable initial angular position and the drive shaft has a ridged cross-section. This means that the assembly of the support on the drive shaft requires more than one test to correctly fix the initial angular position of the set.

Finally, another one of the objectives of the invention is to enable the blade to be assembled and disassembled for the purpose of repair or replacement in a simple manner. Therefore, the windshield wiper device 100 comprises second snap-fitting means for keeping the support 24 and the drive shaft 44 attached to one another.

These snap-fitting means are formed by a perimeter groove 40 provided in the drive shaft 44 and a second snap-fitting member 38 provided in the third housing 36.

This second snap-fitting member 38 is movable between a snap-fitting position and a release position.

In the snap-fitting position the head of the second snap-fitting member 38 snap fits in the perimeter groove 40. In contrast, in the release position, the second snap-fitting member 38 is separated from the perimeter groove 40, and the support 24 and the drive shaft 44 can be separated from one another.

The embodiments described heretofore represent non-limiting examples, such that one skilled in the art will understand that within the scope of the invention, multiple among the claimed features which go beyond the examples that have been shown are possible.

The invention claimed is:

1. A blade for a windshield wiper device for wiping a windshield surface comprising:
    [a] a blade body made of an elastic material with a wiping projection for wiping said windshield surface and extending longitudinally and
    [b] a longitudinal rib having first and second ends, characterized in that
    [c] said blade body comprises a first housing extending longitudinally inside said blade body, said first housing having an enclosed perimeter along its length thereof and having at least one insertion end, in that
    [d] said rib has a cross-section complementary to the cross-section of said first housing, and in that
    [e] said rib further comprises a plurality of interlocking members protruding from a surface of said rib by way of a harpoon with an interlocking end and said plurality of interlocking members being oriented such that
        [i] they allow the insertion of said first end of said rib through said insertion end for assembling said blade,
        [ii] but prevent the extraction of said rib from said first housing by the interlocking of said interlocking end in said blade body, and
    [f] each of the interlocking members of said plurality of interlocking members protrudes individually from said rib laterally, upwards or downwards and with a regular distribution along said rib, wherein at least some of said plurality protrude from said rib laterally, at least some of said plurality protrude from said rib upwards, and at least some of said plurality protrude from said rib downwards.

2. The blade according to claim 1, characterized in that said first housing and said rib respectively have complementary rectangular cross-sections, with two opposite larger sides and two opposite smaller sides, said wiping projection protruding from one of said larger sides.

3. The blade according to claim 1, characterized in that each of the interlocking members of said plurality of interlocking members protrudes from at least one of said larger sides, from at least one of said smaller sides, or from both larger and smaller sides simultaneously.

4. The blade according to claim 1, characterized in that said rib and said interlocking members are formed from a single part.

5. The blade according to claim 1, characterized by said first housing having a longitudinally extending notch.

6. The blade according to claim 1, characterized in that it further comprises a blade support and in that said blade comprises first snap-fitting means for keeping said rib and said support attached to one another, said snap-fitting means being formed by a first hole provided in said rib and a first snap-fitting member provided in said support, said first snap-fitting member being movable between:
    a snap-fitting position, in which said first snap-fitting member snap fits in said first hole, and
    a release position, in which said first snap-fitting member is separated from said first hole and said rib and said support can be separated from one another.

7. The blade according to claim 6, characterized in that said first hole is provided at said second end.

8. The blade according to claim 6, characterized in that said support comprises a first coupling end having a second housing for receiving said second end of said rib.

9. A windshield wiper device characterized in that it comprises the blade according to claim 6 and further comprises a drive device with an adjustable initial angular position and with an oscillating drive shaft, said drive shaft comprising a drive end having a coupling segment, and in that said support comprises a second coupling end having a third housing for receiving said coupling segment, said coupling segment and said third housing, respectively, having complementary cross-sections for tight mutual coupling, and said cross-sections with a regular polygon shape having between three and ten sides.

10. The windshield wiper device according to claim 9, characterized in that said device comprises second snap-fitting means for keeping said support and said drive shaft attached to one another, said snap-fitting means being formed by a perimeter groove provided in said drive shaft and a second snap-fitting member provided in said third housing, said second snap-fitting member being movable between:

a snap-fitting position, in which said second snap-fitting member snap fits in said perimeter groove, and a release position, in which said second snap-fitting member is separated from said perimeter groove and said support and said drive shaft can be separated from one another.

\* \* \* \* \*